(12) United States Patent  
Magnell

(10) Patent No.: US 7,647,752 B2
(45) Date of Patent: Jan. 19, 2010

(54) SYSTEM AND METHOD FOR MAKING CUSTOM BOXES FOR OBJECTS OF RANDOM SIZE OR SHAPE

(76) Inventor: Greg Magnell, 5405 Swallow Ave., Kalamazoo, MI (US) 49009

( * ) Notice: Subject to any disclaimer, the term of this patent is extended or adjusted under 35 U.S.C. 154(b) by 0 days.

(21) Appl. No.: 11/776,813

(22) Filed: Jul. 12, 2007

(65) Prior Publication Data

US 2008/0020916 A1 Jan. 24, 2008

Related U.S. Application Data

(60) Provisional application No. 60/830,407, filed on Jul. 12, 2006.

(51) Int. Cl.
*B65B 43/26* (2006.01)

(52) U.S. Cl. .............. 53/504; 53/456; 53/564; 493/52

(58) Field of Classification Search ............ 53/558, 53/564, 452, 456, 504, 498; 493/52, 84, 493/162
See application file for complete search history.

(56) References Cited

U.S. PATENT DOCUMENTS

| | | | | |
|---|---|---|---|---|
| 3,436,968 A * | 4/1969 | Unger et al. ............... | 73/433 |
| 3,872,644 A * | 3/1975 | Giraudi et al. .............. | 53/52 |
| 4,776,146 A * | 10/1988 | Whitehouse .............. | 53/58 |
| 4,905,512 A * | 3/1990 | Hayashi .................. | 73/169 |
| 5,299,410 A * | 4/1994 | Freeman ................. | 53/442 |
| 5,406,770 A * | 4/1995 | Fikacek .................. | 53/54 |
| 5,566,526 A * | 10/1996 | Suga ..................... | 53/75 |
| 5,671,593 A * | 9/1997 | Ginestra et al. .......... | 53/504 |
| 5,816,990 A * | 10/1998 | Melville ................. | 493/22 |
| 5,991,041 A * | 11/1999 | Woodworth ............. | 356/602 |
| 6,349,526 B1 * | 2/2002 | Newman ................. | 53/446 |
| 6,374,580 B1 * | 4/2002 | Kujubu et al. ........... | 53/450 |
| 6,932,751 B1 * | 8/2005 | Ward et al. .............. | 493/25 |
| 6,938,397 B2 * | 9/2005 | Miller .................... | 53/461 |
| 6,979,814 B2 * | 12/2005 | Kudo et al. .............. | 250/221 |
| 6,996,948 B2 * | 2/2006 | Koke et al. .............. | 53/55 |
| 7,263,815 B2 * | 9/2007 | Ballestrazzi et al. ..... | 53/450 |
| 2008/0147244 A1 * | 6/2008 | Braunstein ............. | 700/302 |

* cited by examiner

*Primary Examiner*—Paul R Durand
(74) *Attorney, Agent, or Firm*—Giffors, Krass, Sprinkle, Anderson & Citkowski, P.C.

(57) ABSTRACT

A system and accompanying method produces cartons for randomly sized and shaped objects or groups thereof by automatically measuring minimum bounding dimensions and transferring these dimensions to an automatic carton-making system. The system for determining the dimensions of an object to be packaged preferably includes a conveyor for moving the object, a vertically oriented light curtain to determine the height of the object, a horizontally oriented light curtain to determine the width of the object, and a tachometer synchronized to the conveyor enabling at least one of the light curtains to determine the length of the object. A computerized interface between the measurement apparatus and carton-making system may include an algorithm for virtually rotating the object to produce a carton just large enough to fit the object. The carton may be a corrugated carton or non-corrugated carton, and the carton-making system may be supplied with a continuous feed of "fanfolded" raw material or it may be sheet-fed. The system for determining the dimensions of an object to be packaged is capable of determining the dimensions of a group of objects to be packaged.

16 Claims, 18 Drawing Sheets

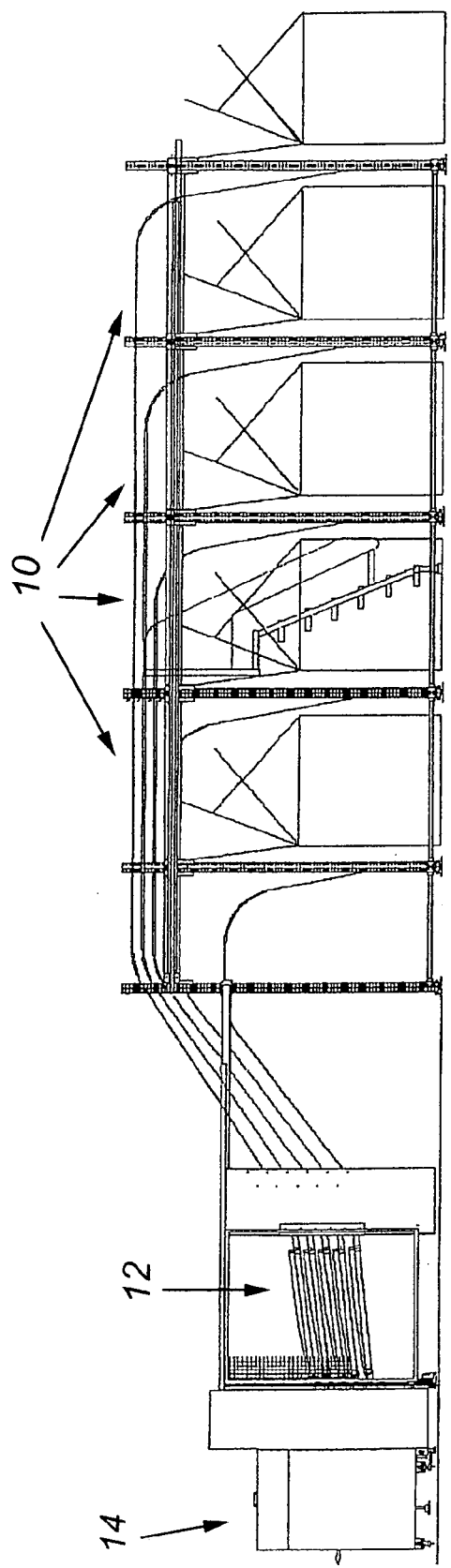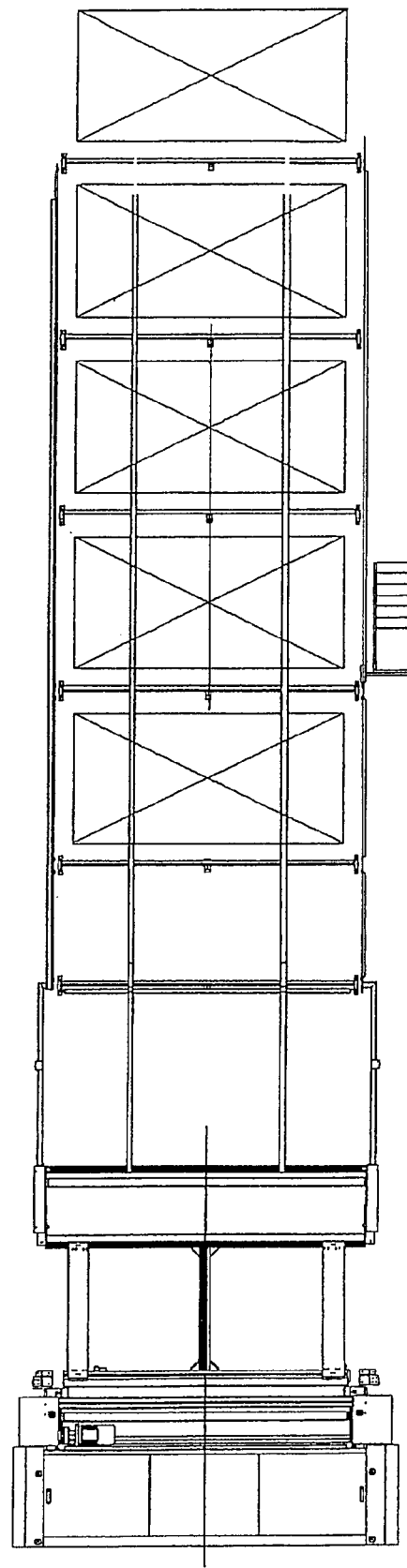
Fig - 1A (PRIOR ART)
Fig - 1B (PRIOR ART)

```
         Max    Value Read
   @Start  5
   @5ms    5
   @10ms   6
   @15ms   7
   @20ms   8
   @25ms  10
   @30ms  10
   @35ms  11          ──────── 1102
   @40ms  10
   @45ms  10
   @50ms   9
   @55ms   9
   @60ms   8
   @65ms   8
   @70ms   7
   @75ms   7
   @80ms   6
   @85ms   6
   @90ms   6
   @95ms   6
   @End    6
```

| | LeftMost | RightMost | Tachometer Reading |
|---|---|---|---|
| @Start | 12 | 13 | 0 pulses |
| @5ms | 11 | 13 | 100 pulses |
| @10ms | 11 | 13 | 200 pulses |
| @15ms | 11 | 13 | 300 pulses |
| @20ms | 10 | 14 | 400 pulses |
| @25ms | 10 | 14 | 500 pulses |
| @30ms | 9 | 15 | 600 pulses |
| @35ms | 9 | 15 | 700 pulses |
| @40ms | 8 | 16 | 800 pulses |
| @45ms | 7 | 16 | 905 pulses |
| @50ms | 7 | 16 | 1001 pulses |
| @55ms | 6 | 17 | 1110 pulses |
| @60ms | 6 | 17 | 1200 pulses |
| @65ms | 7 | 17 | 1300 pulses |
| @70ms | 7 | 16 | 1400 pulses |
| @75ms | 8 | 15 | 1505 pulses |
| @80ms | 9 | 15 | 1610 pulses |
| @85ms | 10 | 14 | 1700 pulses |
| @90ms | 10 | 14 | 1800 pulses |
| @95ms | 11 | 13 | 1900 pulses |
| @End | 11 | 12 | 2000 pulses |

SYSTEM AND METHOD FOR MAKING CUSTOM BOXES FOR OBJECTS OF RANDOM SIZE OR SHAPE

REFERENCE TO RELATED APPLICATION

This application claims priority from U.S. Provisional Patent Application Ser. No. 60/830,407, filed Jul. 12, 2006, the entire content of which is incorporated herein by reference.

FIELD OF THE INVENTION

This invention relates generally to carton construction and, in particular, to a system and method for making custom boxes for objects of random size or shape.

BACKGROUND OF THE INVENTION

There are many industries that must package objects having different sizes for shipment, warehousing, and other operations. There are commercially available carton-producing machines that are capable of producing customized boxes in the size and style needed. Such machines use corrugated cardboard to produce boxes on demand that vary in dimensions typology and quantity.

A side of a typical machine is depicted in FIG. 1A; a top view is shown in FIG. 1B. Required box dimensions are either input manually or determined from a bar code or previously generated list of carton sizes. Based upon this input, fan-fold raw material having a sufficient width is drawn from one of the stations 10 and delivered to a staging area 12. From there, the material is cut and scored at 14 to produce a flat panel that may be folded and glued or stapled to produce a box large enough to fit the object to be packaged. Although supplies 10 reduce waste by providing material of varying width, a more automated dimensioning capability would enhance efficiency and reduce costs.

SUMMARY OF THE INVENTION

This invention enables producers and distributors of random-sized objects to manufacture corrugated cartons or protective corrugated inner-packs that are specifically sized to individual objects or bundles of objects.

The preferred embodiment provides a system and accompanying method to produce a carton for an object of a specific size by automatically measuring the object's minimum bounding dimensions and transferring these dimensions to an automatic carton-making system. The dimensional measuring is fully integrated with the automatic or semi-automatic carton-making apparatus. The coupling of the dimensional measuring process with the box-making process allows for the production of the smallest possible protective carton for an object or objects.

The system for determining the dimensions of an object to be packaged preferably includes a conveyor for moving the object, a vertically oriented light curtain to determine the height of the object, a horizontally oriented light curtain to determine the width of the object, and a tachometer synchronized to the conveyor enabling at least one of the light curtains to determine the length of the object. A computerized interface between the measurement apparatus and carton-making system may include an algorithm for virtually rotating the object to produce a carton just large enough to fit the object.

The carton may be a corrugated carton or non-corrugated carton, and the carton-making system may be supplied with a continuous feed of "fanfolded" raw material or it may be sheet-fed. The system for determining the dimensions of an object to be packaged is capable of determining the dimensions of a group of objects to be packaged.

Overall, the invention consumes less corrugated paperboard material for the protective package, reduces the weight of the overall package, minimizes the amount of protective inner-packaging materials, and minimizes the amount of shipping space per package. For producers or distributors that handle a large quantity of objects that widely vary in size, the invention improves the efficiency of the packaging supply chain and reduces the amount of labor associated with packaging by improving the process of selecting and transporting protective cartons to the area(s) where products are packed.

BRIEF DESCRIPTION OF THE DRAWINGS

FIG. 1A is a side view of an existing box-making machine;
FIG. 1B is a top view of an existing box-making machine;
FIG. 15A shows how a box may be produced with no flaps at all.

DETAILED DESCRIPTION OF THE INVENTION

As discussed in the Summary, this invention improves upon existing systems by allowing producers or distributors of random-sized objects to manufacture corrugated cartons or protective corrugated inner-packs that are specifically sized to individual products or bundles of products. Each carton is made to a size determined by an automatic dimensional measuring process. The dimensional measuring process, integrated with an automatic or semi-automatic carton-making machine, allows for the production of the smallest possible protective carton for each corresponding unit to be packed. This allows the user to consume less corrugated material for the protective package, reduce the weight of the overall package, minimize the amount of protective inner-packaging materials, and minimize the amount of shipping space per package. The system also impacts the process of selecting and transporting protective cartons to the area(s) where products are packed.

According to the invention, products or a group of products unitized into a single bundle are conveyed into the system. As they are conveyed they pass through or under a measuring device that measures the three dimensions of the product. Regardless of the product's orientation on the conveyor, the dimension reading system gives the three dimensions corresponding to the outermost points of the product or bundle, and the three dimensions correspond to that of the smallest rectangular box that will fit around the product or bundle.

With measuring complete, the reading system sends the dimensional data over an integration link to an automatic or semi-automatic corrugated carton-making system. The integration link may be a direct link to the computer system on the box-making machine, or a link to an intermediate computing system which, in turn, sends a modified set of information to the box-making system. The corrugated carton/box-making system receives the dimensional data over a direct or network connection.

Figure 2:
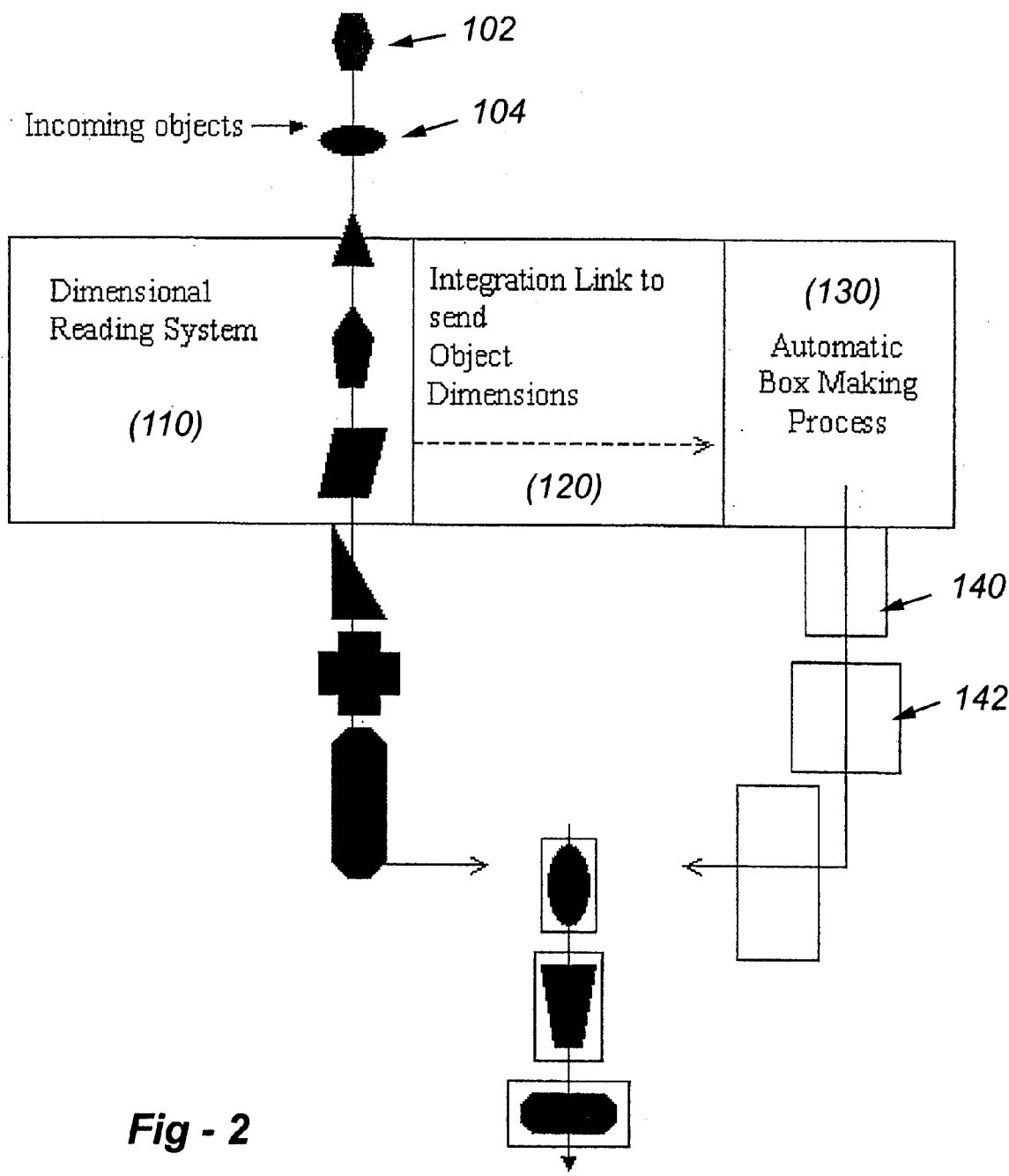
FIG. 2 is a simplified flow diagram of the preferred embodiment of the invention.

Referring now to the illustrations, the preferred embodiment includes three primary components, namely, an optical dimension reading system 110; and integration link or intermediate processing station 120; and a corrugated carton-making machine 130. With particular reference to FIG. 2, incoming objects 102, 104, etc., pass through dimension reading system 110 operative to determine the outermost points of each object in three dimensions. Dimensional information is compiled and passed through an integration link 120 to an automated box-making unit 130. The box-making unit 130 manufactures cartons 140, 142, etc., having dimensions optimized for each of the objects 102, 104, etc. Each of these components will be introduced, followed by a detailed description.

Figure 3:
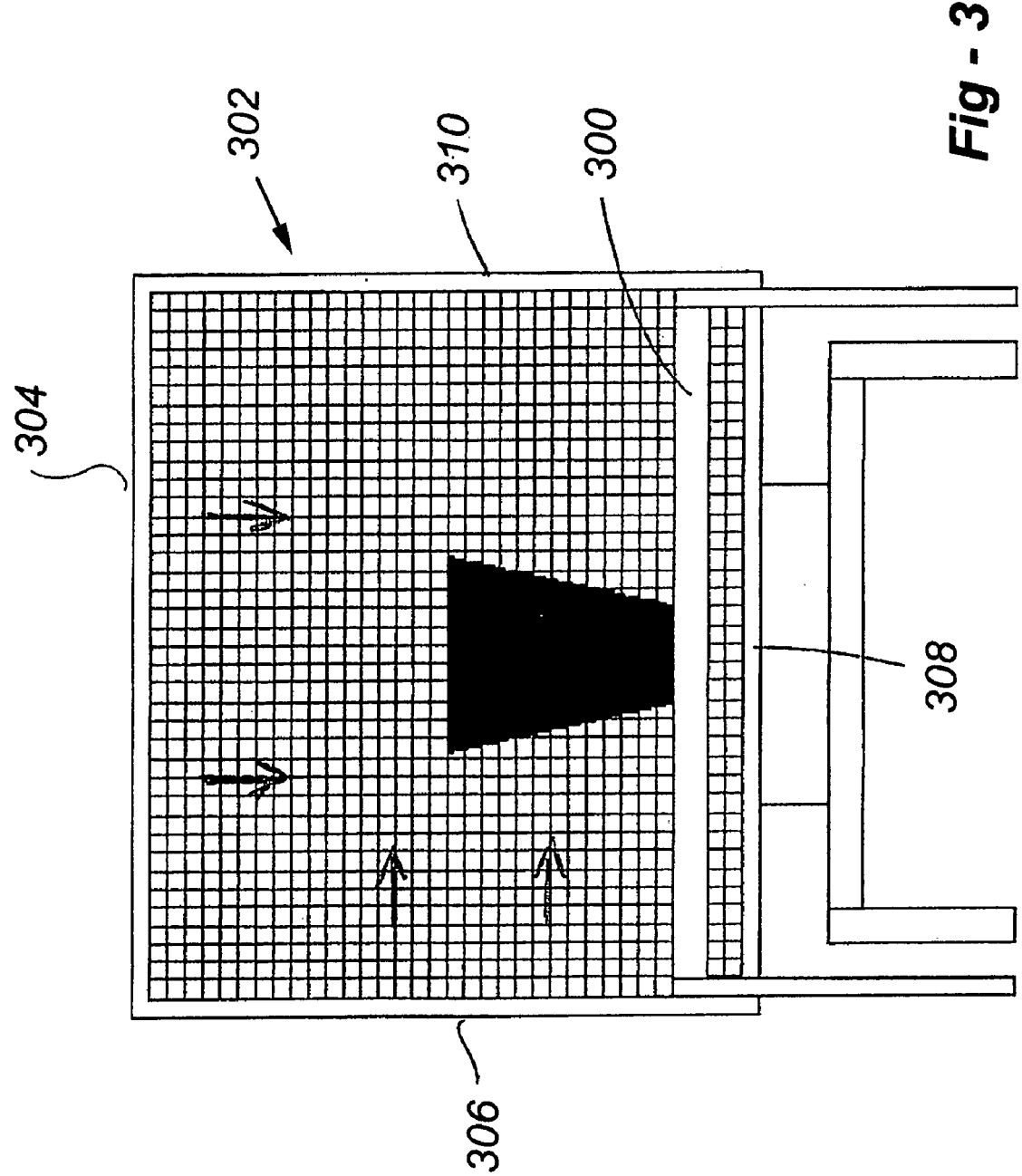
FIG. 3 is an end-on view of an optical scanner used to determine the dimensions of an object to be packaged.
Figure 4:
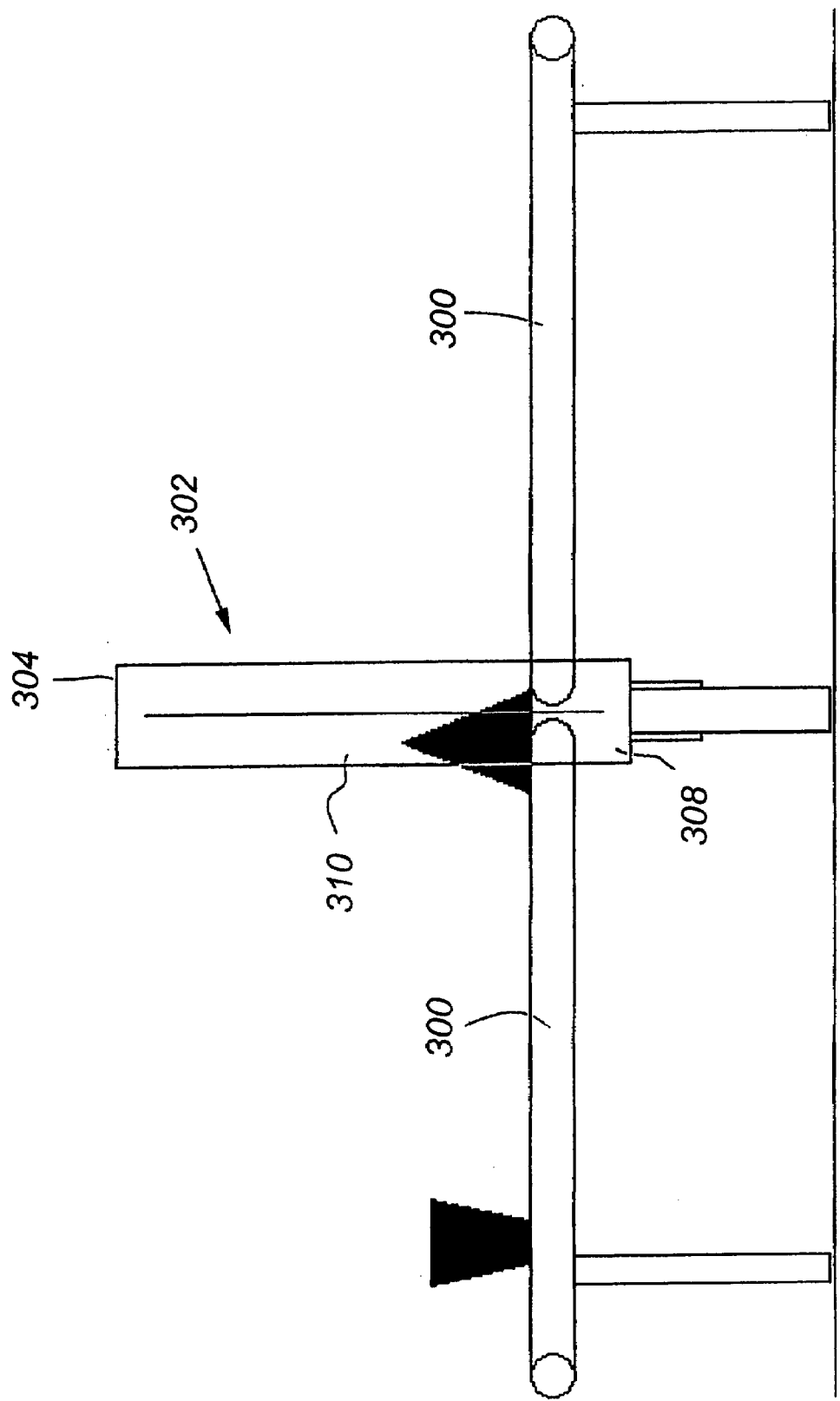
FIG. 4 is a simplified side view of the optical scanner.

The dimension reading system 110 is itself composed of multiple functional subsystems, including conveying apparatus, dimensional calculation, and transmission of dimensional data. Beginning with the conveying apparatus, FIG. 3 is an end-on view of an optical scanner used to determine the dimensions of an object to be packaged, and FIG. 4 is a side view of the optical scanner. The objects to be boxed are shown in solid black. FIG. 3 shows on of the objects passing through a frame 302 hiving an upper member 304 and a side member 306, each having light emitters to generate separate light curtains (shown with the cross-hatching). Across from emitter 304 is a row of detectors 308, and across from emitters 306 is a row of detectors 310. The positions of the emitter/detector pairs may be swapped to produce the same results. The system may utilize infrared, laser, or other optical transmission and reception technologies to detect the object.

The measurement of an object's dimensions is a dynamic process, in that products are measured as they move on conveying line 300. To ensure accuracy the conveying line travels at a constant speed. As the object passes through the measuring device, it creates shadows on each row of light detectors. A processing unit performs a mathematical calculation used to determine the measurements of the product's three dimensions based upon the inputs received from the detectors. The three dimensions are calculated via a mathematical algorithm that is able to determine the volume of the object as scanned. In addition, algorithms are used to rotate the object in virtual space to determine the smallest box to fit the object, with or without allowance for packaging materials.

The use of rotation is desirable if an object is skewed on the conveyer belt. For example, if a cubic object goes through the frame 304 on an angle, without rotation the system may determine that the object requires a box larger than necessary. With rotation in multiple dimensions, however, the object may be normalized or registered to use the smallest possible carton, thereby reducing waste.

The dimension data is either sent directly to the carton-making system via the output port on the dimension reading system, or to another processing platform. In any case, the dimension reading system may use a serial link or an Ethernet link. Data may be transmitted using RS-232, TCP/IP or UDP/IP over Ethernet. If the integration is a direct link, the carton-making machine programming must be synchronized with the reading system output format. The data format will at a minimum include the three dimensions calculated. Other information, such as object orientation or overall dimensions, is recorded before box size calculation. An intermediate processing platform such as a PC or PLC may be used to provide a translation of the dimension reading system format to the carton-making machine data receipt format.

The carton-making machine determines the type or design of box to use, the dimensions, and the quantity to produce. The design and quantity can either be set at default values or added by an operator at the time of dimension data receipt. The carton-making machine may also set default threshold values that conditionally determine the carton design to be used. For example if dimension 1 is below a set threshold—carton design 1 is used. If dimension 1 is above a threshold—carton design 2 is used.

In order to receive the dimension data from the output of the dimension reading system, or an intermediate system, the carton-making machine electrical control platform must be able to accept dimensional data via an Ethernet network or serial link.

The type of carton-making machine is preferably an automatic setup machine capable of producing a wide range of carton sizes and styles. The machine will typically produce single cartons of a different size in succession. The carton-making machine will either use corrugated sheets or fan-folded corrugated material as a base raw material.

Based on the dimensions received and type or design of carton to use, the carton-making machine will automatically position all cutting and scoring mechanisms, and feed/index raw material to produce the appropriately sized carton. The carton-making machine may be composed of an automatic creasing and cutting machine only. In this case the finished carton will be flat with creases and cuts positioned according to the dimensions received and design used. Subsequent processing equipment may be included in the corrugated converting system. In this case subsequent actions such as carton gluing, taping or stapling or erecting may be performed manually or automatically as technology permits.

Figure 5:
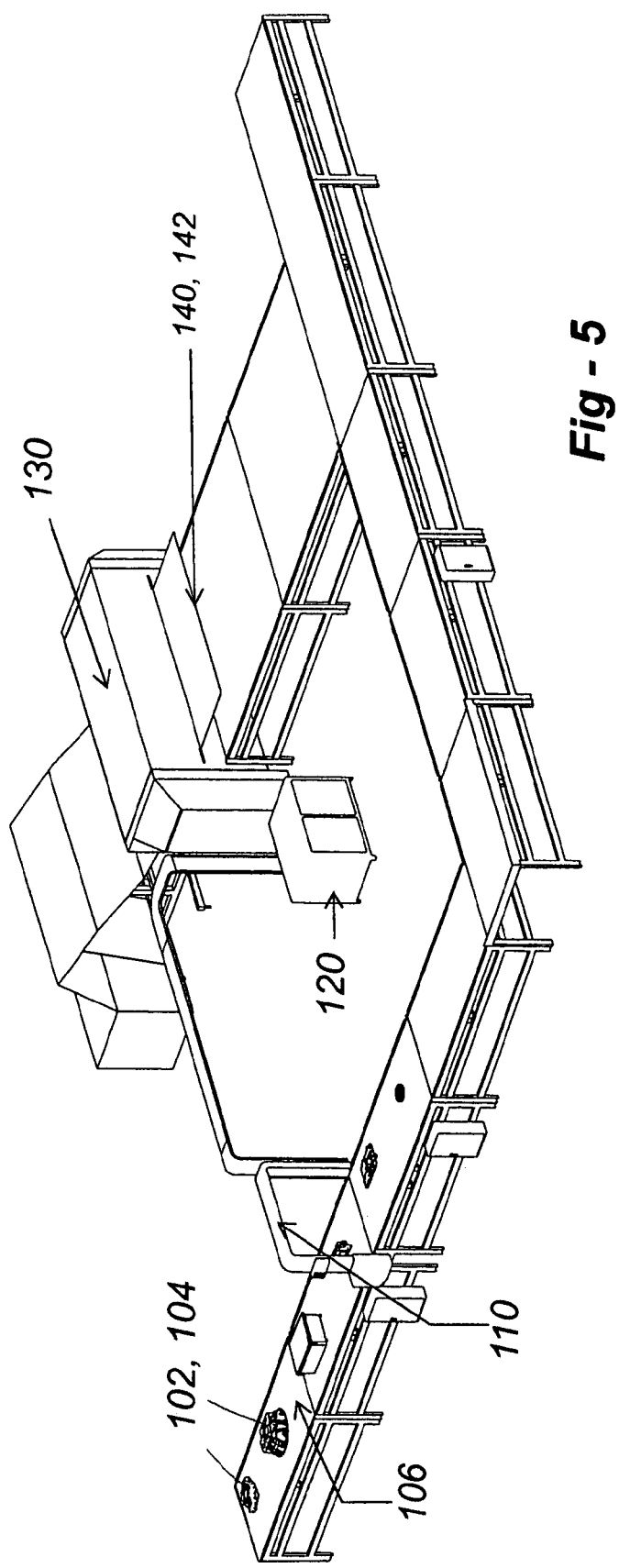
FIG. 5 is a perspective layout of a complete system.

FIG. 5 is a more detailed drawing which shows the three main components of the system, namely, the Optical Dimension Reading System 110, the Integration Link 120 with or without Intermediate Processing, and the Corrugated Carton-Making Machine 130.

An object or a group of objects 102, 104 that have been unitized into a single bundle are conveyed into the system via an introductory conveyor 106. This conveyor is preferably a motorized conveyor such as a slider bed, roller bed, or line shaft conveyor. The introductory conveyor 106 passes the object(s) 102, 104 through or under the measuring device 110 which measures the three dimensions of the product. Regardless of the product's orientation on the conveyor the dimension reading system gives the three dimensions of the smallest rectangular box that will fit around the object or bundle, as discussed above.

With measuring complete, the reading system sends the dimensional data over integration link 120 to the automatic or semi-automatic corrugated carton-making system 130. The integration link 120 may either be a direct link to the computer system on the box-making machine, or a link to an intermediate computing system which, in turn, sends a modified set of information to the box-making system.

The corrugated carton/box-making system 130 receives the dimensional data over a direct or networked connection. With the three dimensions of an object known, the carton-making machine automatically positions a set of cutting and scoring tools, feeds corrugated raw material and produces a corresponding custom cut and scored box/carton(s) 140, 142.

Optical Dimension Reading System

Figure 6:
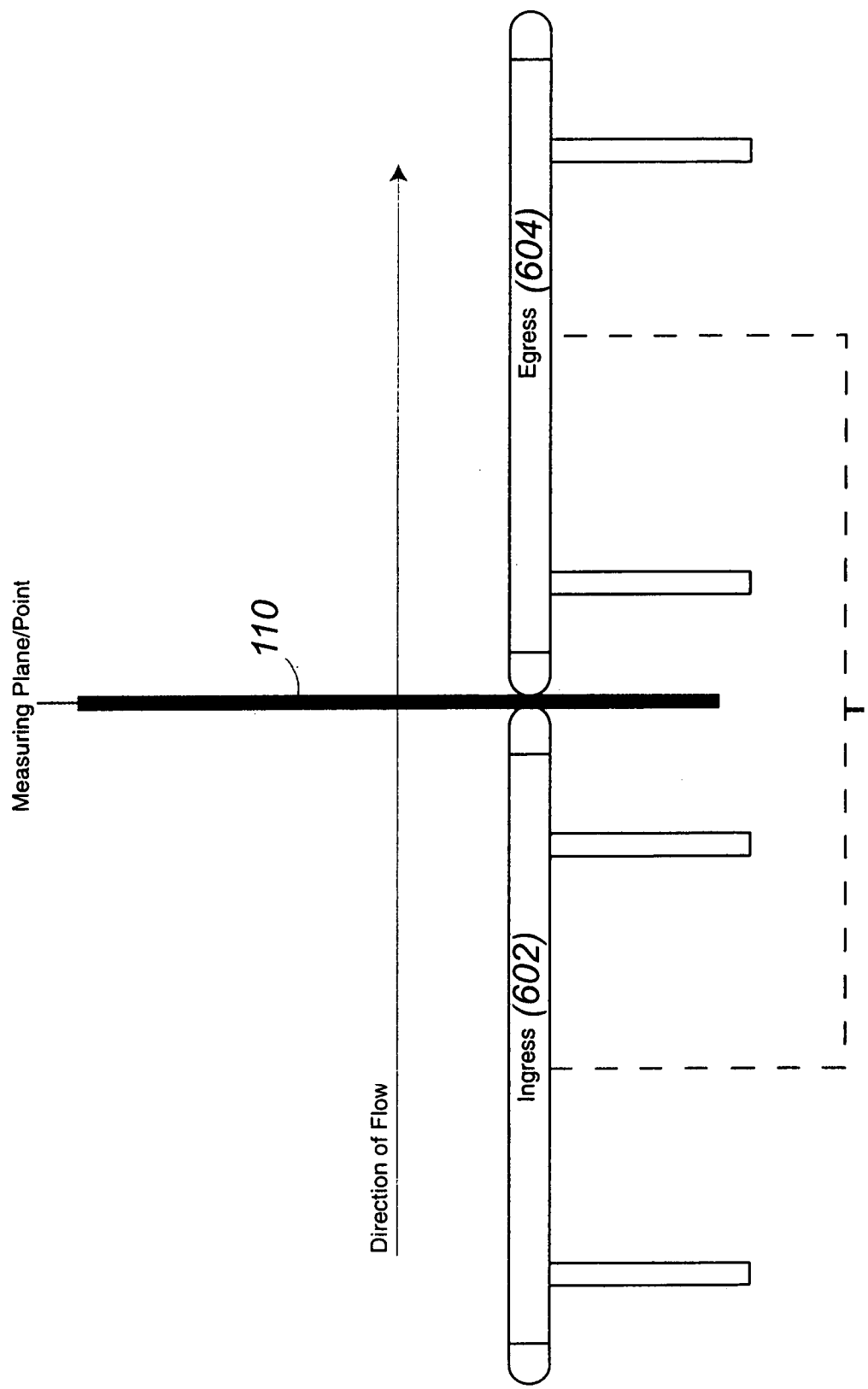
FIG. 6 illustrates how mechanical and/or electronic coupling is used to provide equal/constant velocity and equal/constant acceleration or deceleration.

The measuring of a bundle's dimensions occurs while moving past measuring device 110. The conveying line introduces and transfers objects uninterrupted through the measuring apparatus that is placed between two conveyors, as shown in FIG. 6. The two conveyors (designated ingress and egress; 602, 604) are synchronized to allow the object to move at the same speed through the measuring apparatus 110. The ingress and egress conveyors 602, 604 transport each object through the measuring device such that any change in speed of one occurs simultaneously on the other. This can be done via electronic control or mechanical coupling. Different types of motorized conveyors can be used, including belt-over-bed conveyors (slider bed), belt over roller, line-shaft roller conveyors, belt-drive conveyors, urethane cord pulley, and so forth.

The measuring apparatus 110 is used to detect the object's minimum and maximum points as it exits the ingress conveyor onto the egress conveyor, and to measure the distance the object has moved while detected. As the object passes it logs information into a set of data buffers on a computing system. The apparatus comprises of two sets of optical sensor arrays and a pulse-encoder tachometer.

Figure 7A:
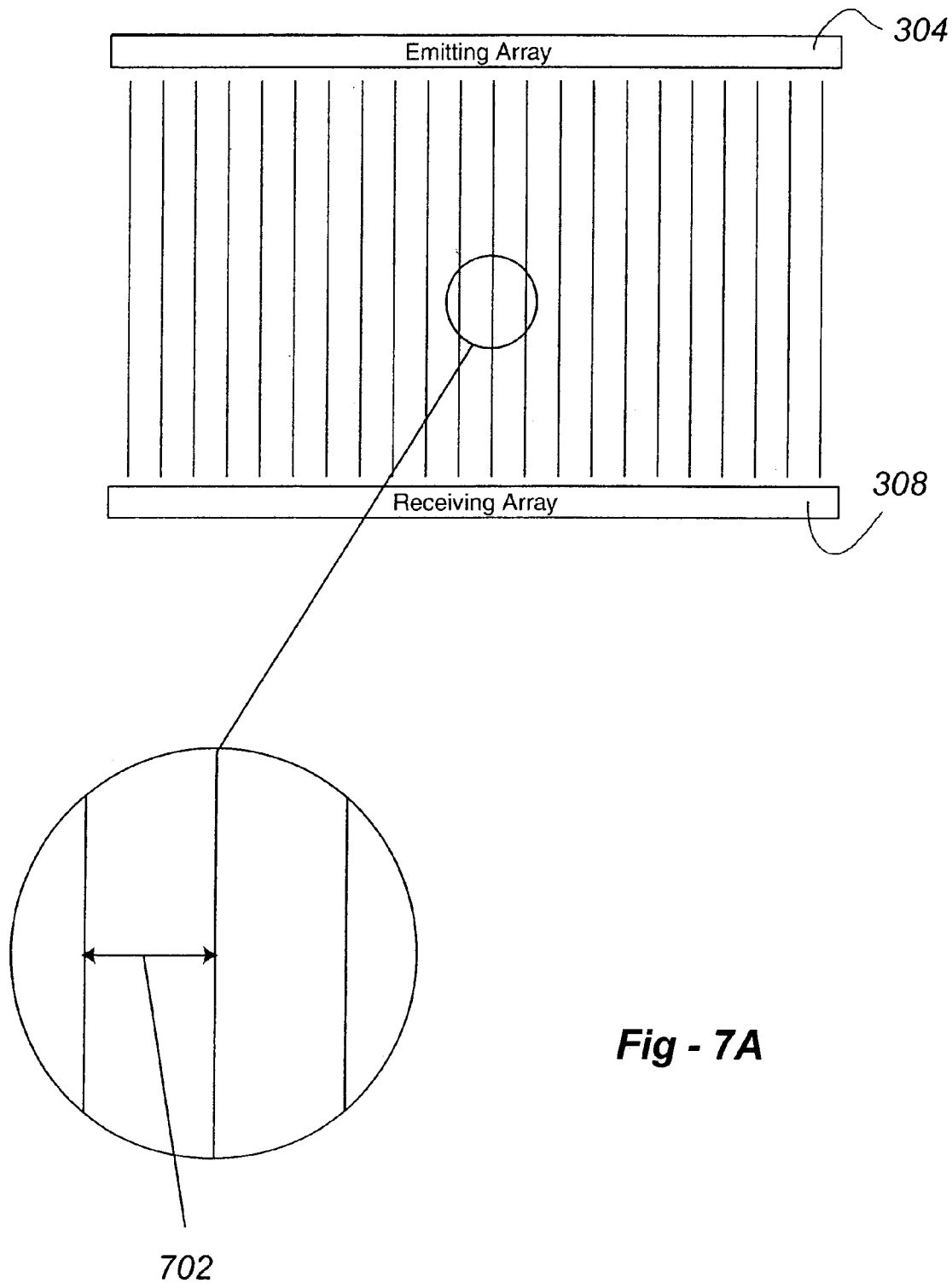
FIG. 7A is a detail drawing that shows fixed spacing between scanning beams.
Figure 7C:
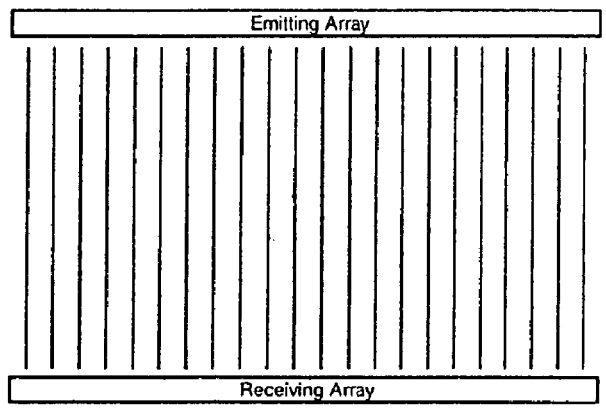
FIG. 7C shows horizontal scanning beams for height measurement.
Figure 7B:
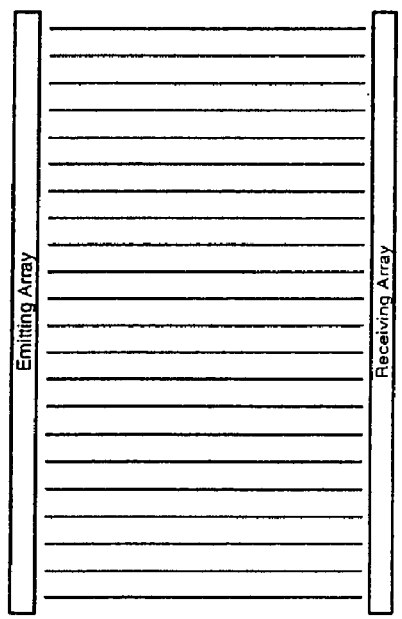
FIG. 7B shows vertical scanning beams for width and length measurement.

As shown in FIG. 7A, each set of optical sensor arrays is comprised of an emitting array 304 and receiving array 308. Each array comprises a set of infrared beam emitters or receivers that are spaced at fixed intervals 702. The emitting and receiving arrays of sensors are mechanically mounted such that they face one another and are parallel to one another at a set distance, and are oriented such that the angle of the line between an emitter and receiver is either 90 degrees to the floor FIG. 7C) or parallel to the floor (FIG. 7B). The emitter/receiver array that is oriented parallel to the floor is used to log data associated with an objects height, whereas the emitter/receiver array that is oriented 90 degrees to the floor is used to log data associated with an objects length and width. Both sets of emitting/receiving arrays are mechanically mounted such that the measurement of the height and length/width data may occur at the same time as an object passes.

Each emitter array is electronically controlled such that the emitters turn the infrared beams on and off at a fixed frequency. For example, a set of emitters will transmit a beam 5 ms (milliseconds) on and 5 ms off. Applicable arrays may be obtained from various firms such as Banner and Mettler, Toledo.

Figure 8:
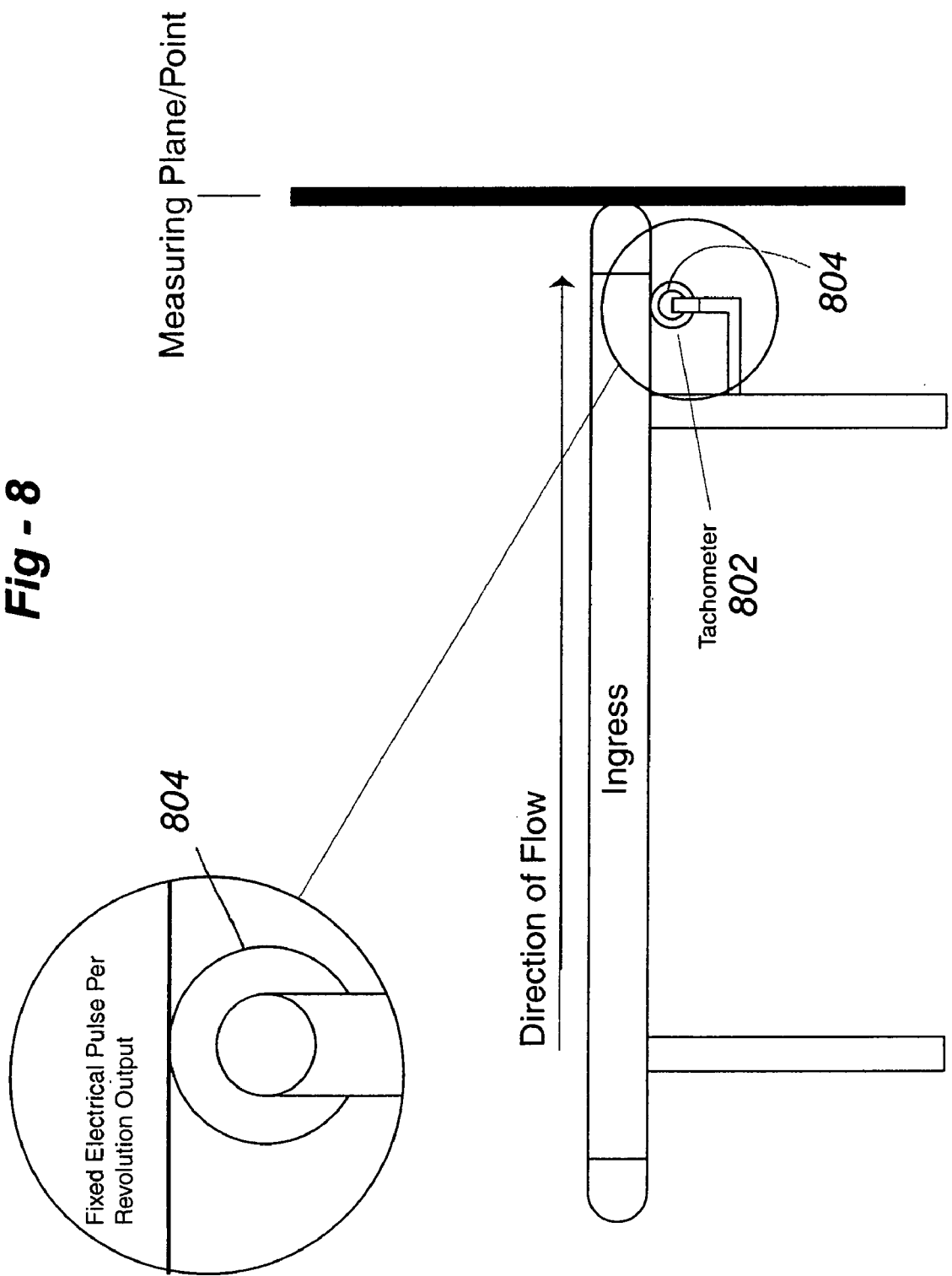
FIG. 8 illustrates the use of a tachometer.

A tachometer 802 is mounted on the ingress conveyor 602, as shown in FIG. 8. This device is preferably a standard rotary optical pulse encoder that is friction mounted to the conveyor by a fixed wheel 804. As the wheel turns due to the conveyor movement, electrical pulses are sent at a fixed frequency per revolution. Each pulse corresponds to a distance traveled by the conveyor.

Integration Link

Dimension Calculation Computing System with Array Electronic Interface

The electrical outputs of the sensor arrays and the tachometer are interfaced to a computer using various interconnection mechanisms. One example uses two 0-10 volt monitoring ports on a PLC I/O module. These ports would use varying voltage levels to correspond to an emitter position. When an object enters the measuring apparatus the computer begins to log the information from the arrays and the tachometer.

Figure 9A:
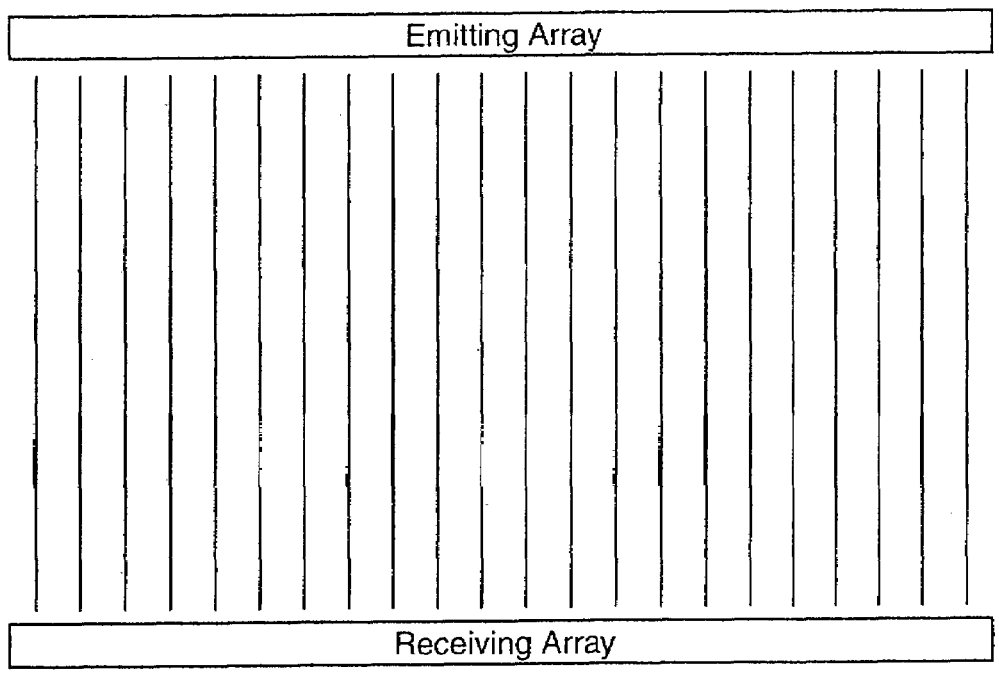
FIG. 9A shows a non-blacked array.
Figure 9B:
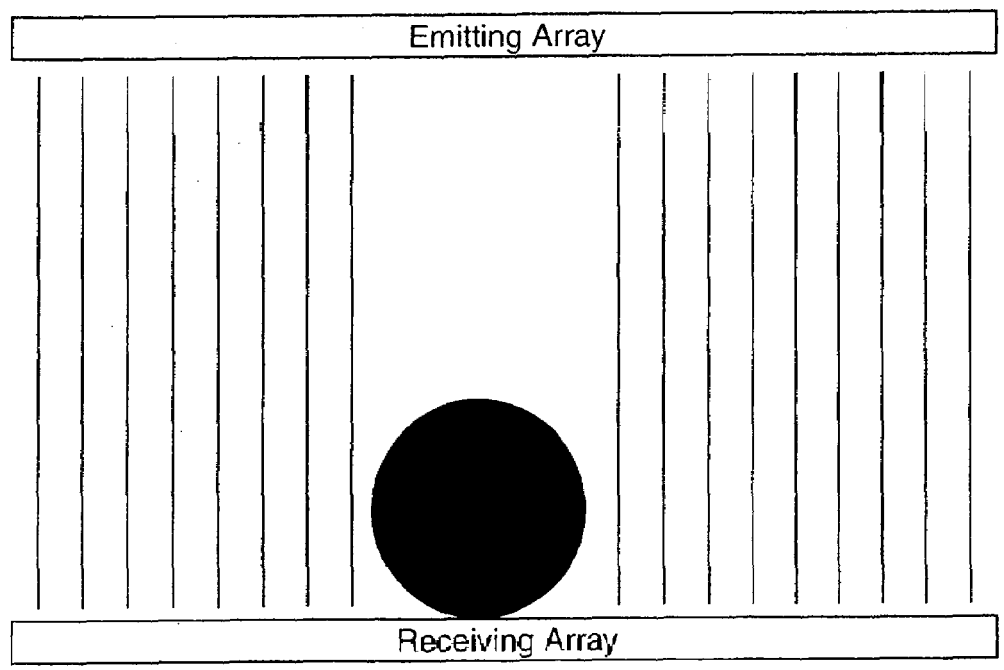
FIG. 9B shows a blacked array.

When an object is not present, each emitter in the array is transmitting a beam that is received, as shown in FIG. 9A. When an object enters, the array emitter beams begin to be blocked (FIG. 9B). When the emitter beams begin to be blocked the computing system begins to log data. A discrete signal may be interfaced from the array to signal the start and end of an object. The data logged comprises of the number of and position of beams blocked or the positions of the leftmost and rightmost emitter blocked. A reading is taken at a fixed frequency as the object passes through the measuring apparatus.

Figure 10:
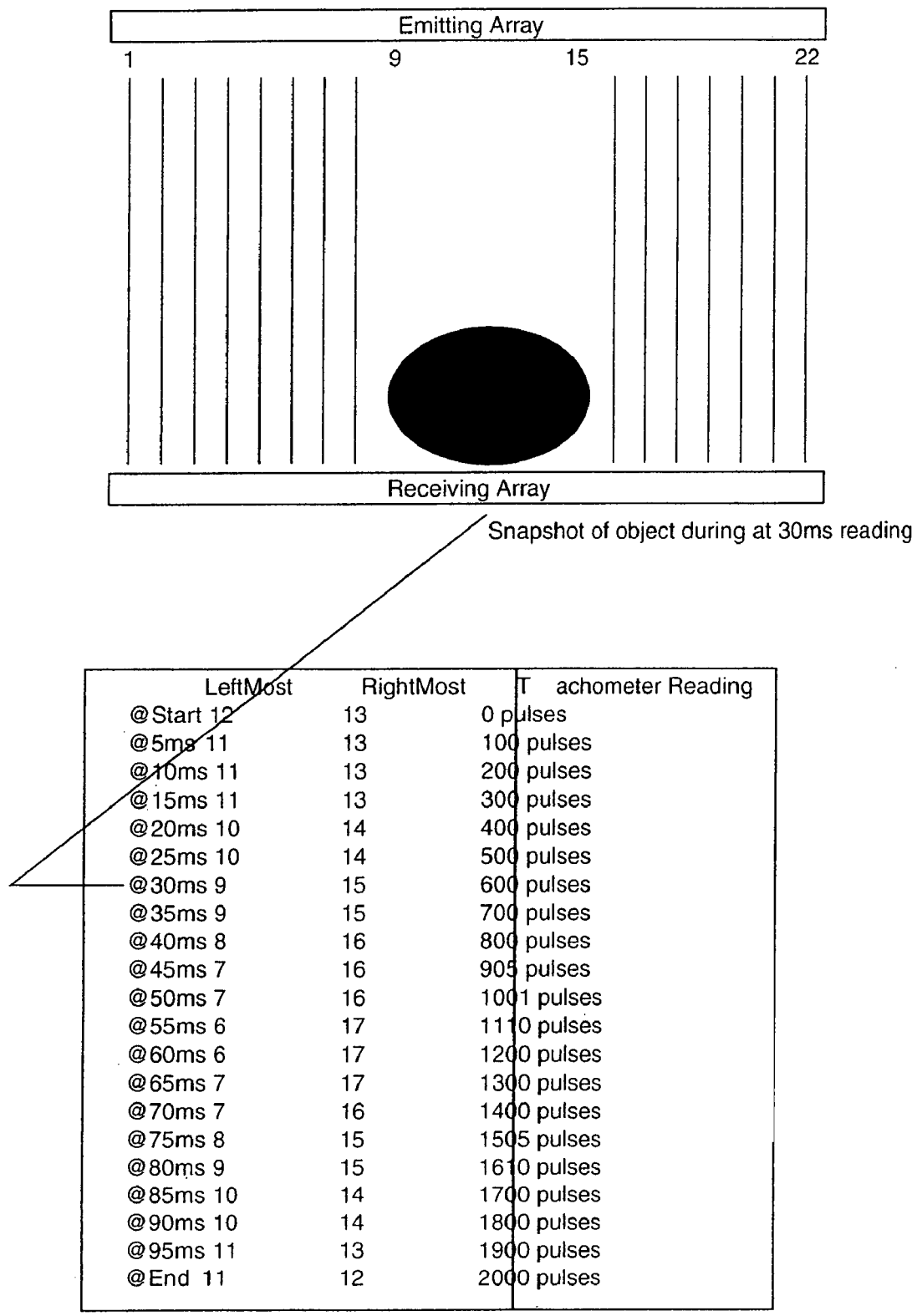
FIG. 10 shows data mapping in one dimension.

For example, if an object takes 100 ms to completely pass through the measuring apparatus, which emits beams every 5 ms, the computing system will log data 20 times, as shown in FIG. 10. When the emitter beams begin to be blocked the computing system also logs the number of electrical pulses that are received from the tachometer. At each reading from the arrays, the computing system logs the number of additional pulses that has occurred from the tachometer since the previous reading.

Figure 11:
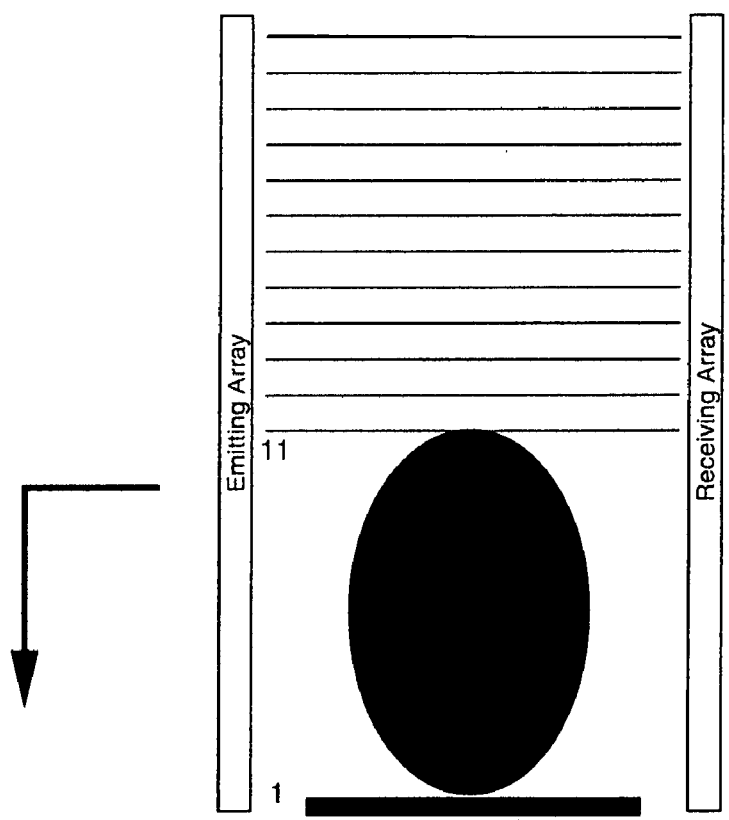
FIG. 11 shows data mapping in a different dimension.

When the object has completely passed through the array(s) data logging ceases and a map of the object's profile is mapped. With data mapped from both the parallel to floor array and the 90-degree to floor array the object's length, width, and height may be calculated. The data received from the array oriented parallel to the floor is mapped to calculate the highest point achieved during the object's pass, as shown in FIG. 11A. This data is mapped as the list of readings from the array. The maximum value in the list corresponds to the objects highest point 1102. The measurement of the highest point of the object is calculated as the maximum value of the data map multiplied by the distance between the emitters within the array.

Figures 12A, 12B:
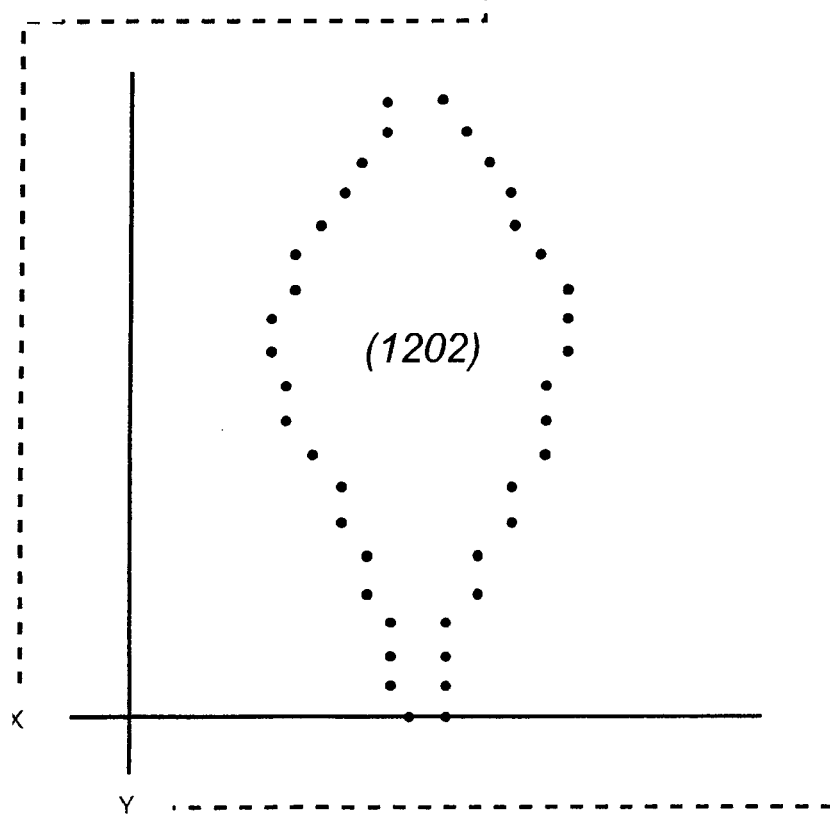
FIG. 12A shows how distance corresponds to the y value on the x/y axis.
FIG. 12B shows how the x values correspond to the leftmost and rightmost values given from the array reading.

The data received from the array oriented 90 degrees to the floor is coupled with the tachometer data to map the objects profile on an x/y axis. This profile is a set of points on an x/y axis. For each reading from the array the distance traveled by the object during the time interval between readings is calculated using the number of pulses read on the tachometer. This distance corresponds to the y value on the x/y axis, as depicted in FIG. 12A. The x values correspond to the leftmost and rightmost values given from the array reading (FIG. 12B). As such, the objects perimeter is mapped on an x/y axis (1202).

Figure 13:
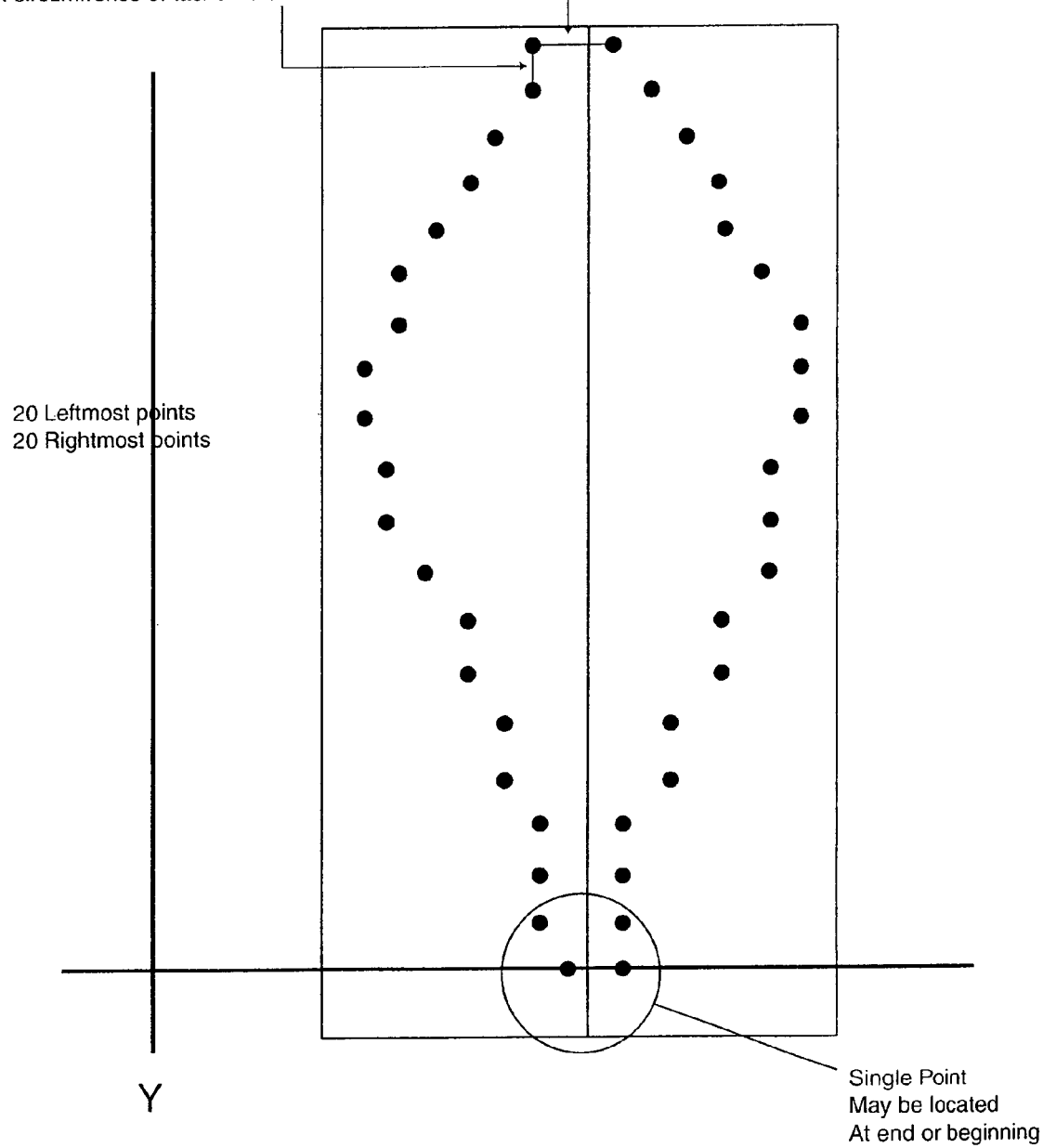
FIG. 13 illustrates that an object takes 100 ms to pass the measuring apparatus, which measures at 5 ms intervals, there will be 20 x/y points for the left most and 20 x/y points for the rightmost perimeter points.

If an object takes 100 ms to pass the measuring apparatus, which measures at 5 ms intervals, there will be 20 x/y points for the left most and 20 x/y points for the rightmost perimeter points, as shown in FIG. 13. If the object has a fine point at the beginning and end of travel there may be only one x/y point at near the beginning or end of object.

With the x/y map of perimeter points, an algorithm may be used to calculate the two smallest values that comprise the minimum bounding rectangle for the object on the axis. There are various algorithms to calculate the minimum rectangle from the 90-degree array. One is the calculation of the convex hull of the object coupled with calculation of the smallest rectangular hull of the convex hull. Several algorithms exist to calculate a convex hull using 2 dimensional data. Example algorithms are as follows:

| | | |
|---|---|---|
| Brute Force | $O(n^4)$ | [Anon, the dark ages] |
| Gift Wrapping | $O(nh)$ | [Chand & Kapur, 1970] |
| Graham Scan | $O(n \log n)$ | [Graham, 1972] |
| Jarvis March | $O(nh)$ | [Jarvis, 1973] |
| QuickHull | $O(nh)$ | [Eddy, 1977], [Bykat, 1978] |
| Divide-and-Conquer | $O(n \log n)$ | [Preparata & Hong, 1977] |
| Monotone Chain | $O(n \log n)$ | [Andrew, 1979] |
| Incremental | $O(n \log n)$ | [Kallay, 1984] |
| Marriage-before-Conquest | $O(n \log h)$ | [Kirkpatrick & Seidel, 1986] |

These values achieve from this algorithm coupled with the height value give the minimum bounding box size for the object.

Transmission of Computed Dimensional Data

Figure 14:
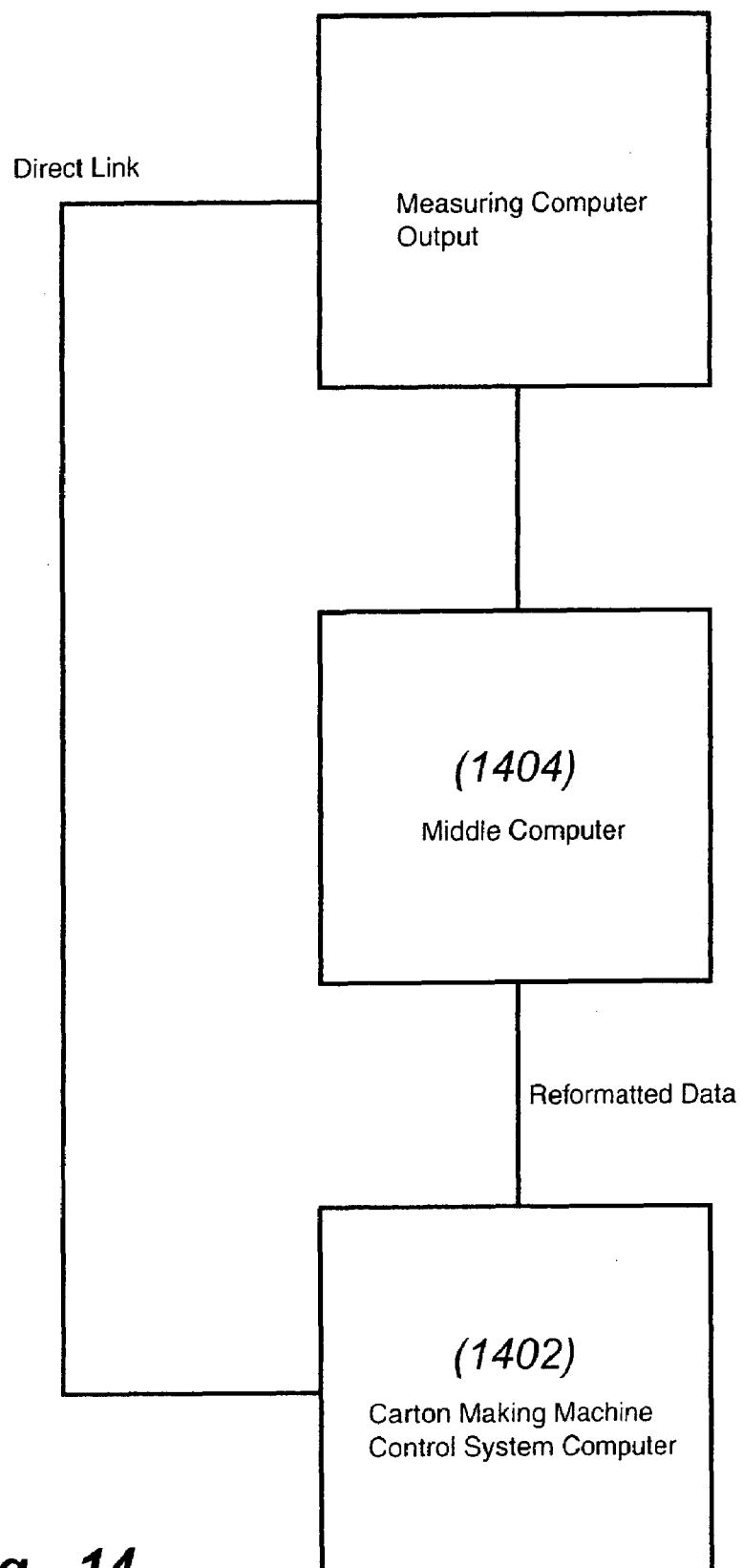
FIG. 14 depicts links between the output of the measuring computer, the use of a middle computer, and carton-making processor.

Once the object has passed through the measuring apparatus and the dimensions have been calculated, the computing system must format and transmit the data on an output port 1402, shown in FIG. 14. Using a data transmission format the dimensions read may be sent to a remote computer, which in this case will either be the control system of a carton-making machine 1402 or a middle computer 1404 that reformats data for retransmission. Several types of output transmission standards may be used, such as RS-232, RS485, TCP or UDP over IP. An Ethernet network is normally utilized to transmit the data using IP. The data format will at a minimum include the three dimensions calculated. Other information such as the time of transmission, a transmission identification, or other calculated items such as object orientation.]

Integration Link with or without Intermediate Processing

Figure 15A:
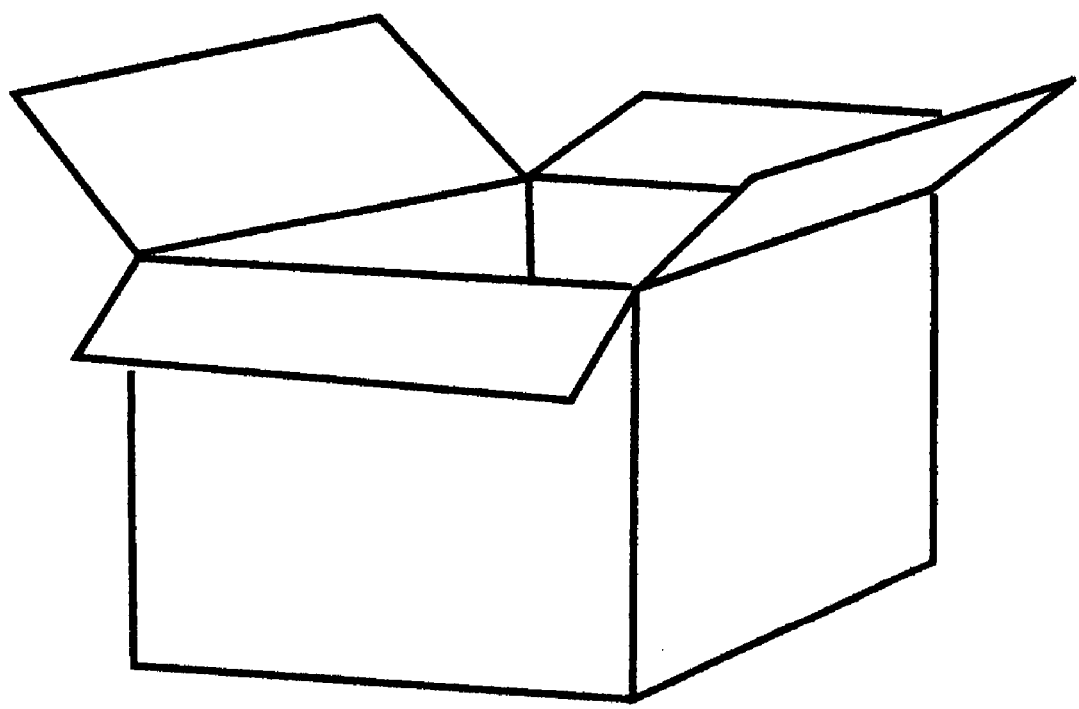
FIG. 15A shows how a box may be produced that uses flaps that overlap on the top.
Figure 15B:
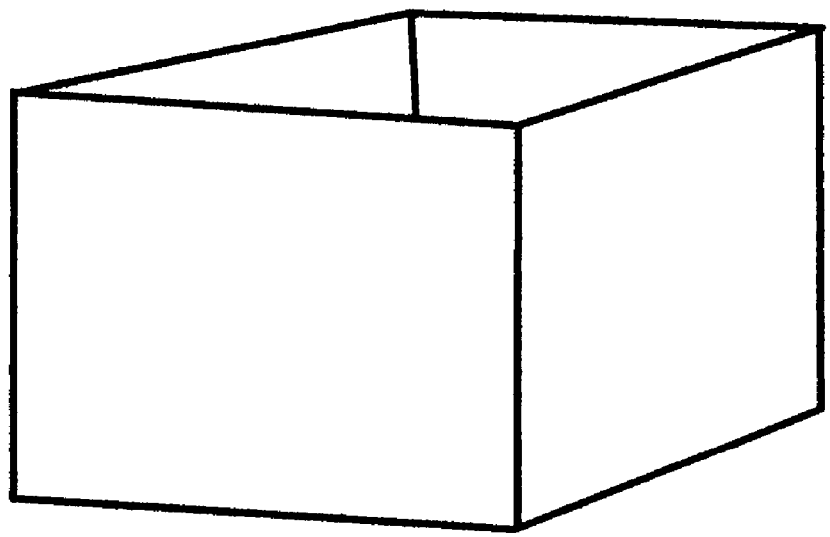

When the dimension data is received by a middle computer or directly by the control system on a carton-making machine a software-integration enables a carton to be produced. This integration allows the dimensions received to be used as entry data within the general software apparatus that controls the carton-making machine. Many carton-making machines are capable of producing a box of three specific dimensions via different cutting and creasing patterns. For example, one box may be produced that uses flaps that overlap on the top, another with no flaps at all. Both of these types may have the same dimensions, as shown in FIGS. 15A and B.

Figure 16:
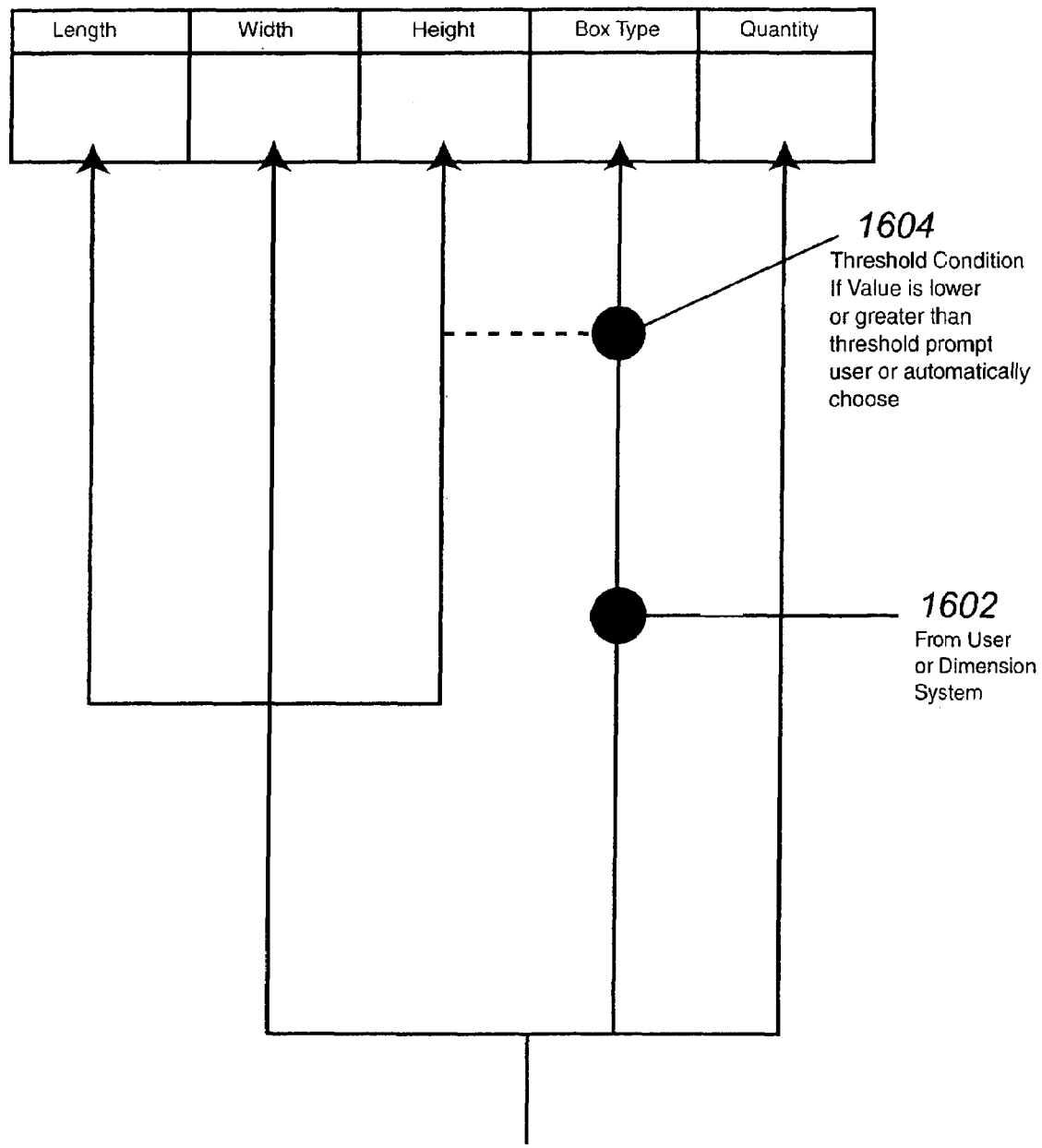
FIG. 16 provides an example of the data necessary to produce a custom carton.

When the carton-making machine receives dimensional data from the measuring apparatus, the software integration automatically provides a default type of carton pattern to use, or provides a prompt to the machine operator at 1602 in FIG. 16. The software interface may also provide a rule-based program that chooses different types of carton patterns to be used when the dimensions received fall with certain thresholds 1604. For example, if the height dimension received is below a certain value, a specific box pattern should be used that is different from a default value.

The software interface also provides the ability for the operator to enable or disable the receipt of information from the measuring apparatus. The software interface may also provide other information that is required by the carton-making machine to produce a box. For example, a raw material type may be necessary, or the desired quantity of cartons to be produced. The use of a middle computer may be necessary to provide a software interface that adds the parameters that a certain carton making machine requires.

Corrugated Converting System

Figure 17A:
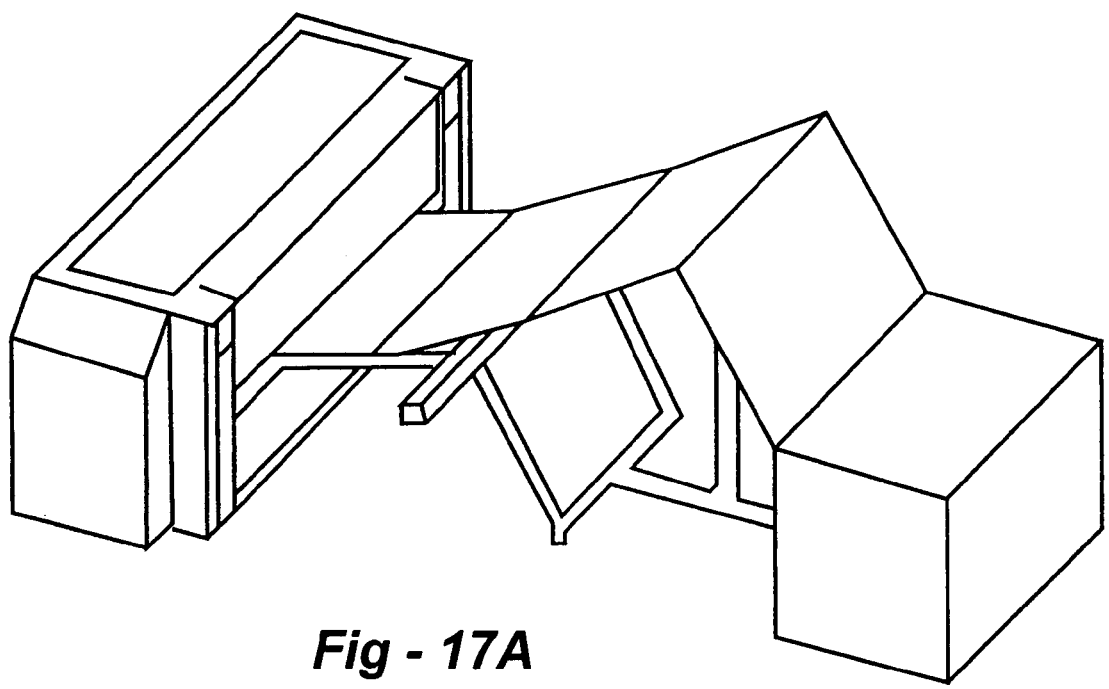
FIG. 17A illustrates a continuous feeding "fanfolded" raw material carton-making machine.
Figure 17B:
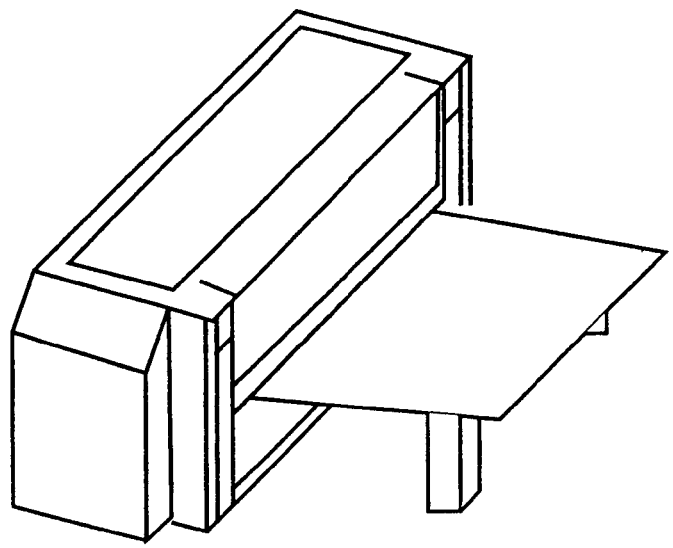
FIG. 17B depicts a sheet-fed raw material carton-making machine.

The type of carton-making machine to be used is an automatic setup machine capable of producing a wide range of carton sizes and styles. The machine will typically produce single cartons of a different size in succession. The carton-making machine will either use corrugated sheets (FIG. 17A) or fan-folded continuous corrugated material as a base raw material (FIG. 17B). Based on the dimensions received and type or design of carton to use, the carton-making machine should be able to automatically position all cutting and scoring mechanisms, and feed/index raw material to produce the appropriately sized carton. Examples of this type of machine are manufactured by Panotec SRL of Italy, Autobox of the United kingdom, Emsize of Sweden, and T-ROC of Arkansas USA.

The carton-making machine may be composed of an automatic creasing and cutting machine only. In this case the finished carton will be flat with creases and cuts positioned according to the dimensions received and design used. Subsequent processing equipment may be included in the corrugated converting system to fold or perform other operations to further process the carton for packing. In this case subsequent actions such as carton gluing, taping or stapling or erecting may be performed.

Once a box has been produced by the carton-making machine, it will typically be ejected onto a conveyor or table. If the object that has been measured is to be immediately placed into the carton the conveying system of the measuring apparatus and the exit conveyor of the carton-making machine should be synchronized such that there is a minimal distance between the object and the produced carton.

I claim:

1. Custom carton-making apparatus, comprising:
   a system for determining the three dimensions of at least one object to be packaged;
   a carton-making system; and
   a computerized interface between the system for determining the dimensions of the object and the carton-making system, the computer interface being operative to control the carton-making system to produce a carton having a height, a width and a length just large enough to fit the object; and
   wherein the computerized interface includes an algorithm for virtually rotating the object to produce a carton just large enough to fit the object.

2. The apparatus of claim 1, wherein the system for determining the dimensions of an object to be packaged includes:
   a conveyor for moving the object; and
   a plurality of light curtains through which the object passes.

3. The apparatus of claim 2, including:
   a vertically oriented light curtain to determine the height of the object; and a horizontally oriented light curtain to determine the width of the object.

4. The apparatus of claim 2, including a tachometer synchronized to the conveyor enabling one of the light curtains to determine the length of the object.

5. The apparatus of claim 1, wherein the carton is a corrugated carton.

6. The apparatus of claim 1, wherein the carton-making system is supplied with a continuous feed of "fanfolded" raw material.

7. The apparatus of claim 1, wherein the carton-making system is supplied with a continuous feed of sheet-fed raw material.

8. The apparatus of claim 1, wherein the system for determining the dimensions of an object to be packaged is capable of determining the dimensions of a group of objects to be packaged.

9. Custom carton-making apparatus, comprising:
a conveyor for moving at least one object to be packaged;
a plurality of light curtains through which the object passes for determining the dimensions of the object, including a vertically oriented light curtain to determine the height of the object and a horizontally oriented light curtain to determine the width of the object;
a carton-making system; and
a computerized interface between the light curtains and the carton-making system, the computer interface being operative to control the carton-making system to produce a carton with a height and width just large enough to accommodate the height and width the object or group of objects to be packaged; and
wherein the computerized interface includes an algorithm for virtually rotating the object or group of objects to produce a carton just large enough to fit the object or group of objects.

10. The apparatus of claim 9, further including a tachometer synchronized to the conveyor enabling one of the light curtains to determine the length of the object.

11. The apparatus of claim 9, wherein the carton is a corrugated carton.

12. The apparatus of claim 9, wherein the carton-making system is supplied with a continuous feed of "fanfolded" raw material.

13. The apparatus of claim 9, wherein the carton-making system is supplied with a continuous feed of sheet-fed raw material.

14. The apparatus of claim 9, wherein the system for determining the dimensions of an object to be packaged is capable of determining the dimensions of a group of objects to be packaged.

15. The apparatus of claim 9, wherein the carton is a corrugated carton.

16. Custom carton-making apparatus, comprising:
a conveyor for moving an object or a group of objects to be packaged;
a vertically oriented light curtain through which the object or group passes to determine the height of the object or group; and
a horizontally oriented light curtain through which the object or group passes to determine the width of the object,
a tachometer synchronized to the conveyor enabling one of the light curtains to determine the length of the object or group,
a carton-making system; and
a computerized interface between the light curtains and the carton-making system, the computer interface being operative to control the carton-making system to produce a carton with a height, width and length just large enough to accommodate the height, width and length of the object or group of objects to be packaged; and
wherein the computerized interface includes an algorithm for virtually rotating the object or group of objects to produce a carton just large enough to fit the object or group of objects.

* * * * *

UNITED STATES PATENT AND TRADEMARK OFFICE
CERTIFICATE OF CORRECTION

PATENT NO. : 7,647,752 B2  Page 1 of 1
APPLICATION NO. : 11/776813
DATED : January 19, 2010
INVENTOR(S) : Greg Magnell It is certified that error appears in the above-identified patent and that said Letters Patent is hereby corrected as shown below:

On the Title Page, Item (74) *Attorney, agent, or Firm*: Replace "Giffors" with --Gifford--.

Signed and Sealed this

Twenty-ninth Day of June, 2010

David J. Kappos
*Director of the United States Patent and Trademark Office*